US010481805B1

(12) United States Patent
Sahin et al.

(10) Patent No.: US 10,481,805 B1
(45) Date of Patent: Nov. 19, 2019

(54) PREVENTING I/O REQUEST TIMEOUTS FOR CLOUD-BASED STORAGE SYSTEMS

(71) Applicant: EMC Corporation, Hopkinton, MA (US)

(72) Inventors: Adnan Sahin, Needham Heights, MA (US); Wayne D'Entremont, Attleboro, MA (US); Suresh Krishnan, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 14/788,346

(22) Filed: Jun. 30, 2015

(51) Int. Cl.
*G06F 3/06* (2006.01)

(52) U.S. Cl.
CPC ............ *G06F 3/0619* (2013.01); *G06F 3/067* (2013.01); *G06F 3/0665* (2013.01); *G06F 3/0689* (2013.01)

(58) Field of Classification Search
CPC .. G06F 9/526; G06F 11/0727; G06F 11/3051; G06F 11/3419; G06F 12/0868; G06F 15/17; G06F 3/0653; G06F 9/466; G06F 11/0757; G06F 11/3055
See application file for complete search history.

(56) References Cited

U.S. PATENT DOCUMENTS

| | | | | |
|---|---|---|---|---|
| 7,136,970 B2* | 11/2006 | Yoshiya | ................ | G06F 3/0611 711/152 |
| 7,159,071 B2* | 1/2007 | Ikeuchi | .................. | G06F 3/061 711/112 |
| 7,203,814 B2* | 4/2007 | Serizawa | .............. | G06F 3/0619 711/114 |
| 7,949,637 B1 | 5/2011 | Burke | | |
| 8,423,529 B1* | 4/2013 | Bloomstein | ....... | G06F 17/30144 707/706 |
| 2009/0070541 A1 | 3/2009 | Yochai | | |
| 2014/0007239 A1* | 1/2014 | Sharpe | .................. | G06F 21/561 726/24 |

(Continued)

OTHER PUBLICATIONS

TScope: Automatic Timeout Bug Identification for Server Systems; He et al.; IEEE International Conference on Autonomic Computing; Sep. 3-7, 2018 (Year: 2018).*

(Continued)

*Primary Examiner* — Daniel C. Chappell
(74) *Attorney, Agent, or Firm* — Krishnendu Gupta; Jason Reyes; Anne-Marie Dinius (57) ABSTRACT

Preventing timeouts of I/O requests at a data storage system that are associated with cloud-based and/or external data storage systems. Rather than allow a timeout to occur, a response is sent to the host at a predetermined time before timeout, which will prevent the timeout from occurring and may cause the host system to "retry" the I/O operation by issuing another I/O request specifying the same I/O operation. The data storage system may repeat this process a preconfigured number of times or indefinitely, or until the host or user terminates or the application crashes. An I/O request received from a host may be configured in accordance with one or more SAN- or NAS-based protocols, and the I/O request may be translated into an I/O request conforming to one or more cloud-based and/or Internet-based protocols and transmitted to a cloud-based and/or external storage system.

20 Claims, 5 Drawing Sheets

(56) References Cited

U.S. PATENT DOCUMENTS

2015/0381709 A1* 12/2015 Word ...................... H04L 49/90
709/203

OTHER PUBLICATIONS

U.S. Appl. No. 13/729,618, filed Dec. 28, 2012, Martin.
U.S. Appl. No. 14/619,627, filed Feb. 11, 2015, Anthony.
EMC Federated Tiered Storage (FTS), Allows Seamless Integration Between EMC Symmetrix VMAX Series and Third-Party Storage Arrays; EMC Corporation; May 2012.

* cited by examiner

PREVENTING I/O REQUEST TIMEOUTS FOR CLOUD-BASED STORAGE SYSTEMS

BACKGROUND

In modern computer systems, vast amounts of data may need to be accessed by hundreds, thousands or even millions of different entities, including persons and groups (e.g., organizations) of persons. Accordingly, computer systems have been developed in which data is stored on multiple physical storage devices ("PSDs") including, but not limited to magnetic tape, disk drives, solid state storage devices (SSDs, e.g., flash drives) or portions thereof. Typically, these PSDs are grouped together as part of one or more data storage systems (e.g., storage arrays), for example, data storage systems made available by EMC Corporation, headquartered in Hopkinton, Mass. ("EMC").

Entities typically access the data on such data storage systems via one or more host systems (i.e., "hosts") for which communication paths have been established over one or more communication media (e.g., as part of a network) between ports of the host systems and ports of the data storage systems. Through the host systems, data of the data storage system may be accessed and modified using I/O operations, for example, read and write operations. To this end, data storage systems may provide storage services to host systems. Host systems typically do not address the PSDs of the storage system directly, but rather, access the PSDs by addressing virtual (i.e., logical) storage units (VSUs) such as, for example, logical devices, logical volumes (LVs), thin devices and storage groups, which hide the details of actual physical storage from the host. A VSU may or may not correspond one-to-one to a PSD.

In addition to performing I/O operations, data storage systems may be managed (e.g., provisioned and configured). This typically is done via an interface with a peripheral device (e.g., a host system or another device coupled to the storage system), for example, by utilizing application programming interfaces (APIs), command-line interfaces (CLIs) or any suitable combination of the foregoing.

Modern computer systems often employ cloud-based storage systems, in addition, or as an alternative, to proprietary data storage systems. Interactions between data storage systems of a proprietary computer network and cloud-based storage systems typically require translation between SAN- or NAS-based protocols and cloud-based storage protocols.

SUMMARY

This Summary provides an illustrative context for aspects of the invention, in a simplified form. It is not intended to be used to determine the scope of the claimed subject matter. Aspects of the invention are described more fully below in the Detailed Description.

A first I/O request is received at a first data storage system, the first I/O request originating from a host system and specifying an I/O operation to perform on first data, and having an associated first timeout period. It may be determined that the I/O operation is for a second data storage system that is a cloud-based and/or external storage system, and whether the I/O operation has been satisfied by a predetermined amount of time prior to the expiration of the first timeout period. If it is determined that the I/O operation has not been satisfied by a predetermined amount of time prior to the expiration of the first timeout period, a first response to the first I/O request may be sent to the host system that will prevent the first I/O request from timing out.

In some embodiments of the invention, a system is configured with logic to perform one or more of the foregoing acts. Such logic may be embodied in one or more discrete modules of the system.

In some embodiments of the invention, a computer-readable storage device is provided, encoded with computer-executable instructions that, as a result of being executed by a computer, control the computer to perform one or more of the foregoing acts.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Enterprise-class storage systems, and their customers, often demand relatively fast response times to I/O requests, especially for mission-critical applications, after which the request will be deemed to have timed out. For example, hosts systems (i.e., their I/O subsystems) may be configured with certain default timeout values, and customers may be able to configure timeout values, for example, using service level objectives (SLOs) or the like. A host system may be configured to take certain actions after a timeout (e.g., attempt to reset the PSD to which the request directed), and to take more severe measures after a certain number of timeouts, for example, declaring the PSD to be "bad," which may cause one or more applications to crash. When "timeout" is used herein as a noun, it means the expiration of the timeout period.

While historically, enterprise-class storage systems employed standardized SAN-based or NAS-based storage protocols and interfaces, today's storage systems are increasingly employing cloud-based storage systems, typically to produce cost savings, for example, as part of a hybrid storage system in which a customer's proprietary storage and external, cloud-based storage are employed together. In such systems, it can be challenging to satisfy an I/O request for an I/O operation for an external, cloud-based storage before timeout. Typically, the cloud-based storage protocols and interfaces employed by, and the SLOs associated with, such cloud storage systems do not accommodate enforcing the timeout period specified by the enterprise-class host. What's more, there are typically inherent latencies in exchanging I/O communications between a SAN- or NAS-based storage system within a customer's proprietary network and a cloud-based storage system external to such proprietary network. Further, the host system issuing the I/O request may not be aware that the I/O operation is associated with an external, cloud-based storage system, for example, in a tiered storage system in which the primary data storage system tiers certain data to such external, cloud-based storage systems. Such a host system expects enterprise-class response times.

Described herein are mechanisms and techniques for preventing timeouts of I/O requests received within a proprietary computer network that are associated with cloud-based and/or external data storage systems; for example, when cloud-based protocols are employed that do not accommodate enforcing timeout periods associated with an I/O request, e.g., an I/O request from a host in an enterprise-class computer network. In some embodiments, rather than allow a timeout to occur, a response is sent to the host at a predetermined time before timeout, which will prevent the timeout from occurring and may (unless the host is configured otherwise) cause the host system to "retry" the I/O operation by issuing another I/O request specifying the same I/O operation. For example, for a data storage system in which the storage protocol uses SCSI commands, check condition codes may be employed; for example, a status code (e.g., SCSI sense data) of "02/0B/44" may be sent to a host in response to the request, which absent being overridden by the host, will cause the host to retry. The data storage system may be configured to repeat this process a preconfigured number of times or indefinitely, or until the host or user terminates it or the application crashes.

In some embodiments of the invention, an I/O request received from a host is configured in accordance with one or more SAN- or NAS-based protocols, and the I/O request is translated into an I/O request conforming to one or more cloud-based and/or Internet-based protocols and transmitted to a cloud-based and/or external storage system. As described below in more detail, such translation and other techniques described herein may be implemented by a cloud storage gateway and/or a director (e.g., a remote adapter) of a storage system configured accordingly. As used herein, a "cloud gateway storage component" may be a cloud storage gateway or a director or other hardware of software component configured to implement cloud gateway storage techniques.

In embodiments in which synchronous storage techniques are applied (described below in more detail), in response to receiving an I/O request from the host ("host I/O request"), a cloud gateway component (or other component) translates the host I/O request into a translated I/O request, and sent to the cloud-based and/or external storage system. If a response to the translated request is not received before a predetermined time before timeout, a response is transmitted to the host that prevents the timeout, and, as described above, may cause a retry of the request.

In embodiments in which asynchronous storage techniques are applied (described below in more detail), in response to receiving a write request from the host ("host I/O request"), a cloud gateway component (or other component) attempts to cache the write operation (i.e., write the data to cache) before de-staging the I/O operation and sending a translated I/O request to the cloud-based and/or external storage system. If the I/O operation cannot be cached by a predetermined time before timeout (e.g., because the cache is full), a response is transmitted to the host that prevents the timeout, and, as described above, may cause a retry of the request.

EXAMPLES

Figure 1:
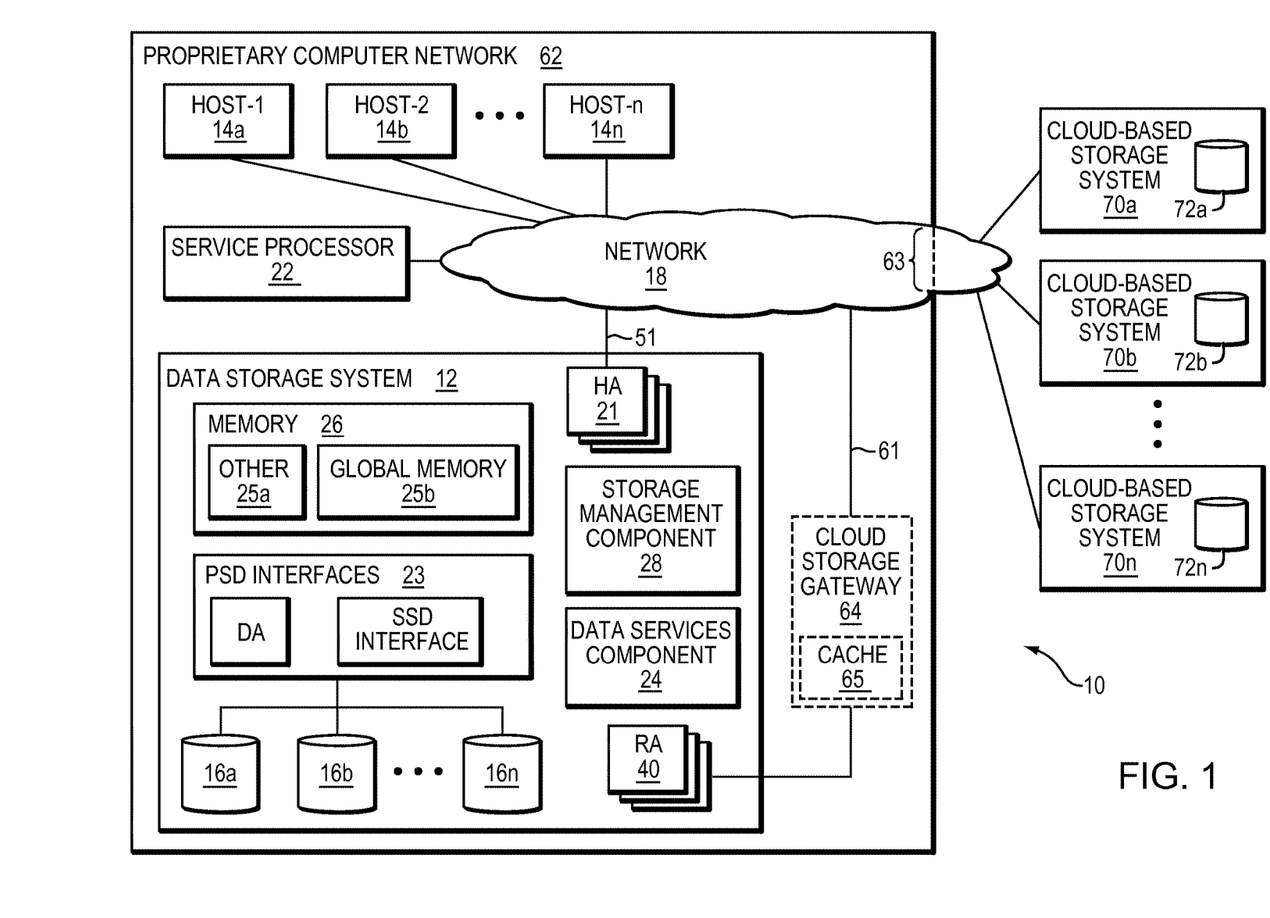
FIG. 1 is a block diagram illustrating an example of a data storage system, in accordance with some embodiments of the invention.

Referring to FIG. 1, shown is an example of an embodiment of a system that may be used in connection with performing the techniques described herein. The system 10 includes a data storage system 12 connected to host systems 14a-14n through network 18. In this embodiment of the computer system 10, the n hosts 14a-14n may access the data storage system 12, for example, in performing input/output (I/O) operations or data requests. The network 18 may include any of one or more of a variety of networks or other type of communication connections as known to those skilled in the art. The network 18 may include any of: a network connection, bus, and/or other type of data link, such as a hard wire or other connections known in the art. For example, the network 18 may include any of: the Internet, an intranet, a network (including a Storage Area Network (SAN)), a network-attached storage network (NAS) and other wireless or other hardwired connection(s) by which the host systems 14a-14n may access and communicate with the data storage system 12, and also may communicate with other components included in the system 10.

Each of the host systems 14a-14n and the data storage system 12 included in the system 10 may be connected to the network 18 by any one of a variety of connections as may be provided and supported in accordance with the type of network 18. The processors included in the host systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host systems 14a-14n and data storage system 12 may all be located at the same physical site, or, alternatively, also may be located in different physical locations. Each such site may be its own data center or any two or more sites may be considered a distributed data center. The one or more communication media of network 18 that may be used to provide the different types of connections between the host computer systems and the data storage system of the system 10 may use a variety of different communication protocols such as SCSI, Fibre Channel, Fibre Channel-over-Ethernet, iSCSI, and the like. Some or all of the connections by which the hosts and data storage system may be connected to the one or more communication media may pass through other communication devices, such as, for example, switching equipment including, but not limited to, a phone line, a repeater, a multiplexer or even a satellite. For example, while not shown in FIG. 1, system 10 may include a switch connected between host system 14 and data storage system 12 such, for example, a Connectrix® switch made available from EMC.

Each of the host computer systems may perform different types of data operations in accordance with different types of tasks. In the embodiment of FIG. 1, any one of the host systems 14*a*-14*n* may issue a data request to the data storage system 12 to perform a data operation. For example, an application executing on one of the host systems 14*a*-14*n* may perform a read or write operation resulting in one or more data requests to the data storage system 12.

It should be noted that although element 12 is illustrated as a single data storage system, such as a single data storage array, element 12 also may represent, for example, multiple data storage arrays alone, or in combination with, other PSDs, systems, appliances, and/or components having suitable connectivity, such as in a SAN, in an embodiment using the techniques herein.

It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with components other than those described herein for purposes of example.

The data storage system 12 may be a data storage array including a plurality of PSDs 16*a*-16*n*. The PSDs 16*a*-16*n* may include one or more types of PSDs such as, for example, one or more disk drives and/or one or more solid state drives (SSDs). An SSD is a PSD that uses solid-state memory to store persistent data. An SSD using SRAM or DRAM, rather than flash memory, also may be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in embodiments in which one or more of the PSDs 16*a*-16*n* is a flash drive. More generally, the techniques herein also may be used with any type of SSD although the following paragraphs may make reference to a particular type such as a flash device or flash memory device.

The data storage array also may include different types of adapters or directors, such as one or more HA(s) 21 (host adapter), RA(s) 40 (remote adapter), and/or PSD interface(s) 23. In a VMAX or VMAX3 storage system, such an adapter and director may be implemented and/or referred to as "emulation." The term "HA" is used herein interchangeably with the term "FA," and the term "PSD interface" is used herein interchangeably with the term "BE." Each of the adapters may be implemented using hardware including a processor with local memory with code stored thereon for execution in connection with performing different operations. The HAs may be used to manage communications and data operations between one or more host systems and the global memory (GM). In an embodiment, the HA may be, or include, a Fibre Channel Adapter or other adapter which facilitates host communication. The HA 21 may be characterized as a front-end component of the data storage system which receives a request from the host. The data storage array may include one or more RAs that may be used, for example, to facilitate communications between data storage arrays, including data storage arrays located outside of proprietary computer network 62 to which the data storage array belongs, as will be described below in more detail. The data storage array also may include one or more PSD interfaces 23 for facilitating data transfers to/from the PSDs 16*a*-16*n*. The data storage interfaces 23 may include PSD interface modules, for example, one or more disk adapters (DAs) (e.g., disk controllers), adapters used to interface with SSDs, e.g., flash devices, and the like. The DAs and SSD interfaces also may be characterized as back-end components of the data storage system which interface with the PSDs.

One or more internal logical communication paths may exist between PSD interfaces 23, RAs 40, HAs 21, and memory 26. An embodiment, for example, may use one or more internal busses and/or communication modules. For example, the global memory portion 25*b* may be used to facilitate data transfers and other communications between the PSD interfaces, HAs and/or RAs in a data storage array. In one embodiment, the PSD interfaces 23 may perform data operations using a cache that may be included in the global memory 25*b*, for example, when communicating with other PSD interfaces and other components of the data storage array. The other portion 25*a* is that portion of memory that may be used in connection with other designations that may vary in accordance with each embodiment.

The particular data storage system as described in this embodiment, or a particular PSD thereof, such as a disk or particular aspects of an SSD, should not be construed as a limitation. Other types of commercially available data storage systems, as well as processors and hardware controlling access to these particular PSDs, also may be included in an embodiment.

Host systems provide data and access control information through channels to the data storage systems, and the data storage systems also may provide data to the host systems through the channels. The host systems do not address the PSDs 16*a*-16*n* of the data storage systems directly, but rather access to data may be provided to one or more host systems from what the host systems view as a plurality of VSUs, e.g., logical devices or logical volumes (LVs). The LVs may or may not correspond to the actual PSDs. For example, one or more LVs may reside on a single PSD or multiple PSDs. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of PSD interface used in connection with facilitating data transfers to/from the associated disk drive(s) and LV(s) residing thereon. An SSD interface may be another type of PSD interface used in connection with facilitating data transfers to/from the associated SSDs and LV(s) residing thereon. It should be noted that an embodiment may use the same or a different PSD interface for one or more different types of PSDs than as described herein.

The PSD interface, such as a DA, performs I/O operations on a PSD 16*a*-16*n*. In the following description, data residing on an LV may be accessed by the PSD interface following a data request in connection with I/O operations that other directors originate. Data may be accessed by LV in which a single PSD interface manages data requests in connection with the different one or more LVs that may reside on a PSD 16*a*-16*n*. For example, a PSD interface may be a DA that accomplishes the foregoing by creating job records for the different LVs associated with a particular PSD. These different job records may be associated with the different LVs in a data structure stored and managed by each PSD interface.

Also shown in FIG. 1 is a service processor 22 that may be used to provide data (e.g., I/O) services and/or storage management services for system 12. In one embodiment, the service processor 22 may be used in collecting performance data, for example, regarding the I/O performance in connection with data storage system 12. This performance data may relate to, for example, performance measurements in connection with a data request as may be made from the different host systems 14a-14n. This performance data may be gathered and stored in a storage area. Additional detail regarding the service processor 22 is described in following paragraphs.

It should be noted that a service processor 22 may be peripheral to the data storage system 12 and may communicate with the data storage system 12 using any one of a variety of communication connections. In one embodiment, the service processor 22 may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

In some embodiments, as an alternative to, or in addition to, service provider 22, storage system 12 may include a data services component 24 and/or a storage management component 28. Storage management component 28 may provide any of a variety or storage management services, for example, one or more storage management tools and applications, including one or more user interfaces, APIs, CLIs or any suitable combination of the foregoing. For example, in some embodiments of the invention, storage system 12 may be, be included within, or include a VMAX3 system made available from EMC, and storage management component 28 may be, be included within, or include a Management Module and Control Station (MMCS) made available as part of a VMAX3 system. Storage management component 28 may be used to configure one or more data service parameters of other components of storage system 12 including, but not limited to, HA 21, RA 40, PSD interfaces 23 and data services component 24, for example, to implement one or more aspects of the invention described herein.

Data services component 24 may provide any of a variety of data services, for example, any of those described herein in relation to service processor 22, including, but not limited to FAST services (described below) and/or other data services described in relation to performance data monitoring software 134 and optimizer 138. For example, in embodiments of the invention in which storage system 12 is, is included within, or includes a VMAX3 system, data services storage management component 28 may be, be included within, or include one or more Enginuity™ Data Services modules (EDSs) made available as part of a VMAX3 system (such modules also are referred to sometimes as "emulations"). It should be appreciated that one or more other elements (e.g., one or more PSD interfaces 23, HAs 21 and/or RAs 40 data services) may be configured to implement one or more data services, or portions thereof, described herein as being performed by data services component 24.

In some embodiments, to enable one or more data services and/or storage management functions to be executed internally within storage system 12, storage system 12 may include an embedded storage hypervisor (not shown), which enables these data services and management functions to be run on their own threads, so as to not interfere with other (e.g., core or traditional) storage activities running within the storage system 12. For example, in embodiments of the invention in which storage system 12 is, is included within, or includes a VMAX3 system, a HyperMax™ hypervisor from EMC may be provided.

Figure 2:
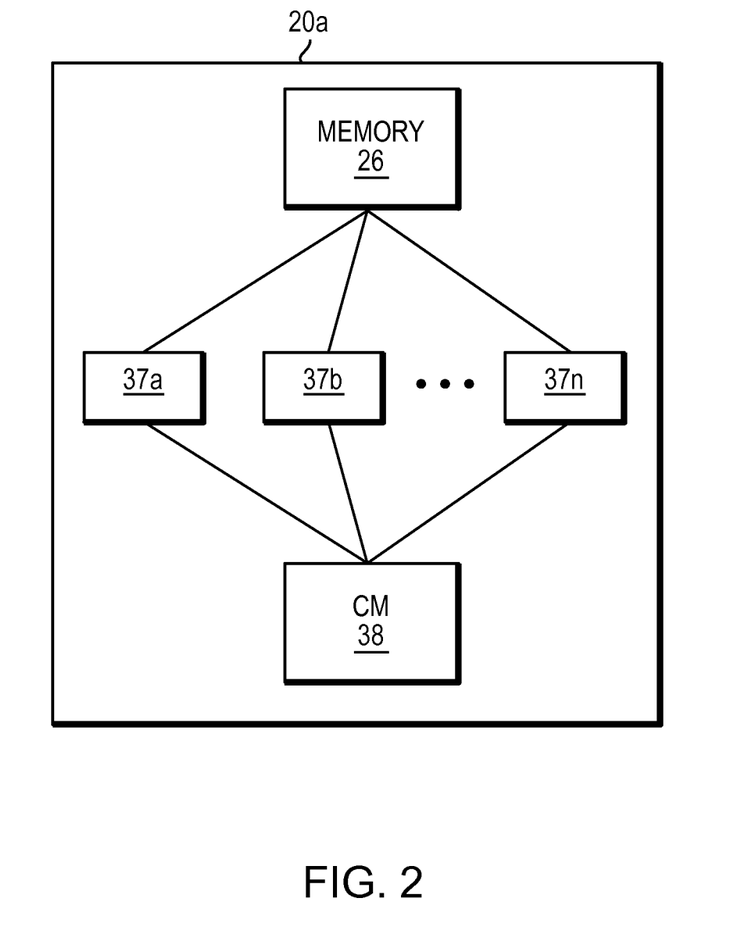
FIG. 2 is a block diagram illustrating an example of logical internal communications between directors and memory of a data storage system, in accordance with some embodiments of the invention.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or PSD interfaces that may be included in a data storage system. In an embodiment disclosed herein, there may be up to sixteen directors coupled to the memory 26. Other embodiments may allow a maximum number of directors other than sixteen as just described and the maximum number may vary with each embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the PSDs 16a-16n. In connection with returning data to a host from one of the PSDs as part of a read operation, the data may be copied from the PSD by the appropriate PSD interface, such as a DA servicing the PSD. The PSD interface may copy the data read into a cache slot included in GM which is, in turn, communicated to the appropriate HA in communication with the host.

As described above, the data storage system 12 may be a data storage array including a plurality of PSDs 16a-16n in which one or more of the PSDs 16a-16n is a flash memory device employing one or more different flash memory technologies. In one embodiment, the data storage system 12 may be a Symmetrix® DMX™ or VMAX® data storage array by EMC Corporation of Hopkinton, Mass. In the foregoing data storage array, the PSDs 16a-16n may include a combination of disk devices and flash devices in which the flash devices may appear as disk drives to the various software tools used in connection with the data storage array. The flash devices may be constructed using nonvolatile semiconductor NAND flash memory. The flash devices may include one or more SLC (single level cell) devices and/or MLC (multi-level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein also may be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

Embodiments in accordance with techniques herein may have one or more defined storage tiers. For example, in some embodiments, Fully Automated Storage Tiering (FAST) technology made available from EMC may be employed, which provides for the optimization of the use of different storage tiers including the ability to easily create and apply tiering policies (e.g., allocation policies, data movement policies including promotion and demotion thresholds, and the like) to transparently automate the control, placement, and movement of data within a data storage system based on business needs. In some embodiments, the FAST techniques described in the following patent may be employed: U.S. Pat. No. 8,838,931, issued Sep. 16, 2014, "Techniques for automated discovery and performing storage optimizations on a component external to a data storage system" to Marshak, et al., which is hereby incorporated by reference in its entirety.

Each tier may generally include PSDs having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a PSD is an SSD drive (such as a flash drive), a particular type of SSD drive (such using flash or a form of RAM), a type of magnetic disk or other non-SSD drive, a rotational speed of the drive (e.g., 7.2K RPM, 10K RPM, 15K RPM), and/or the interface type of the PSD (e.g., Fibre Channel (FC), SATA (Serial Advanced Technology Attachment) or SAS (Serial-attached SCSI)), and the like. Data protection may specify a type or level of data storage protection such, for example, as a particular RAID level (e.g., RAID1, RAID-5 3+1, RAID5 7+1, and the like). Performance characteristics may relate to different performance aspects of the PSDs of a particular type or technology, for example, rotational speed of a disk drive (e.g., 7.2K, 10K or 15K). Storage capacity may specify the amount of data (e.g., in bytes) that may be stored on a PSD. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all disk drives of a relatively high rotational speed or range of speed (e.g., 10K, 15K, 10-15K or greater than 7.2K), and a third tier of all disk drives having a relatively low rotational speed or range of speed (e.g., 7.2K, less than 10K, or 7.2K or less). A disk drive having a relatively high rotational speed (e.g., 10K or 15K) may be referred to herein as a "high-speed disk drive" and a disk drive having a relative low rotational speed (e.g., 7.2K RPM) may be referred to herein as a "low-speed disk drive." The foregoing are some examples of tier definitions and other tier definitions may be specified in accordance with techniques herein.

In some embodiments of the invention, thin devices and thin provisioning may be employed, for example, as described in U.S. Pat. No. 7,949,637, Issued May 24, 2011, "Storage Management for Fine Grained Tiered Storage with Thin Provisioning," to Burke, which is hereby incorporated by reference in its entirety.

Figure 3:
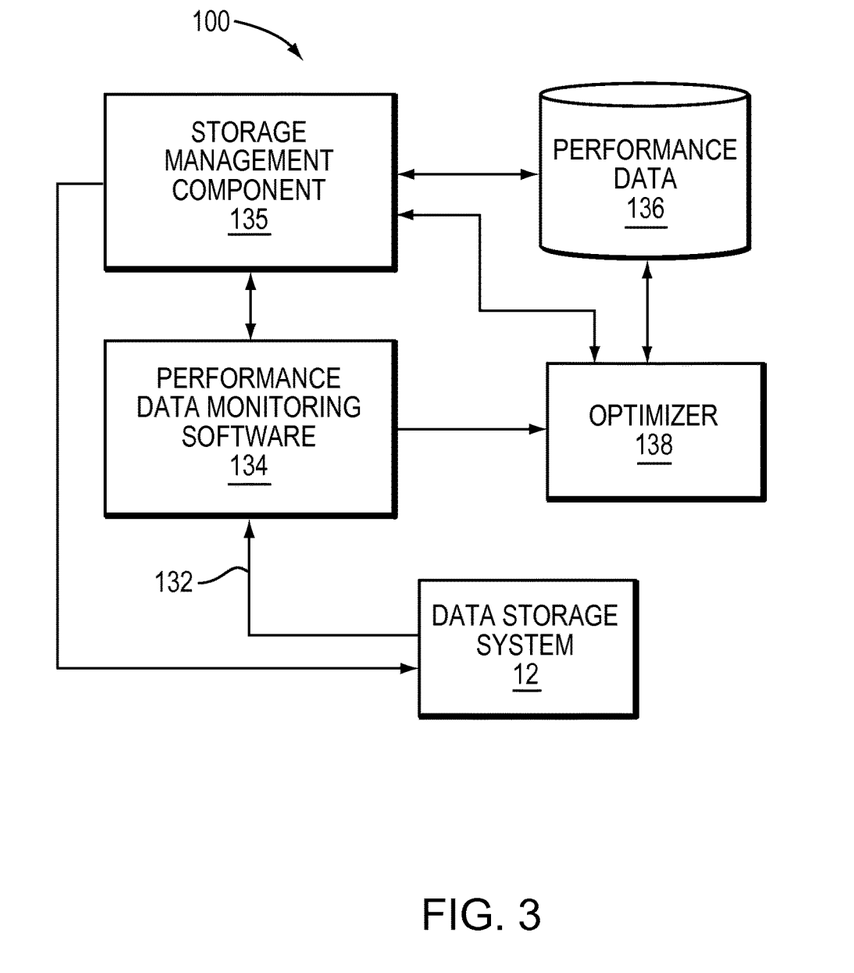
FIG. 3 is a block diagram illustrating an example of components that may be included in a service processor, in accordance with some embodiments of the invention.

Referring to FIG. 3, shown is an example 100 of software that may be included in a service processor such as 22. It should be noted that the service processor may include any one of a variety of commercially available processors, such as an Intel-based processor, and the like. Although what is described herein shows details of software that may reside in the service processor 22, all or portions of the illustrated components also may reside elsewhere such as, for example, on any of the host systems 14a-14n. For example, all or portions of optimizer 138 and/or performance data monitoring software 134 may be implemented as part of data services component 24, and all or portions of storage management component 135 may be implemented as part of storage management component 28 of storage system 12. Service processor 22 may include a storage management component 135 that enables performance of one or more storage management functions, such as, for example, provisioning storage. Service management component may include one or more user interfaces, APIs and CLIs that enable such management, and may utilize performance data 136 to help do so. It should be appreciated that, although storage management component 135, performance data monitoring software 134 and optimizer 133 are illustrated as discrete components in FIG. 3, the invention is not so limited, as any of various combinations of the three elements is possible.

Included in the service processor 22 is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 also may serve as an input to the optimizer 138 which attempts to enhance the performance of I/O operations, such as those I/O operations associated with PSDs 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more PSDs and/or VSUs, including logical devices or volumes (LVs) serving as data devices, thin devices) or other virtually provisioned devices, portions of thin devices, and the like. The workload also may be a measurement or level of "how busy" a PSD or VSU is, for example, in terms of I/O operations (e.g., I/O throughput such as number of IOs/second, response time (RT), and the like).

The response time for a PSD or VSU may be based on a response time associated with the PSD or VSU for a period of time. The response time may be based on read and write operations directed to the PSD or VSU. Response time represents the amount of time it takes the data storage system to complete an I/O request (e.g., a read or write request). Response time may be characterized as including two components: service time and wait time. Service time is the actual amount of time spent servicing or completing an I/O request after receiving the request from a host via an HA 21, or after the data storage system 12 generates the I/O request internally. The wait time is the amount of time the I/O request spends waiting in line or queue waiting for service (e.g., prior to executing the I/O operation).

It should be noted that the operations of read and write with respect to a VSU may be viewed as read and write requests or commands from the DA 23, controller or other backend PSD interface. Thus, these operations also may be characterized as a number of operations with respect to the PSD (e.g., number of PSD reads, writes, and the like, based on PSD accesses). This is in contrast to observing or counting a number of particular types of I/O requests (e.g., reads or writes) as issued from the host and received by a front-end component such as an HA 21. To illustrate, a host read request may not result in a read request or command issued to the DA if there is a cache hit and the requested data is in cache. The host read request results in a read request or command issued to the DA 23 to retrieve data from the disk drive only if there is a read miss. Furthermore, when writing data of a received host I/O request to the PSD, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to PSD accesses such as disk reads and writes that may result from a host I/O request received by an HA 21.

The optimizer 138 may perform processing of the techniques herein set forth in following paragraphs to determine how to allocate or partition physical storage in a multi-tiered environment for use by multiple applications. The optimizer 138 also may perform other processing such as, for example, to determine what particular portions of thin devices to store on PSDs of a particular tier, evaluate when to migrate or move data between PSDs of different tiers, and the like. It should be noted that the optimizer 138 may generally represent one or more components that perform processing as described herein as well as one or more other optimizations and other processing that may be performed in an embodiment.

Described in the following paragraphs are techniques that may be performed to determine promotion and demotion thresholds (described below in more detail) used in determining what data portions of thin devices to store on PSDs of a particular tier in a multi-tiered storage environment.

Such data portions of a thin device may be automatically placed in a storage tier where the techniques herein have determined the storage tier is best to service that data in order to improve data storage system performance. The data portions also may be automatically relocated or migrated to a different storage tier as the workload and observed performance characteristics for the data portions change over time. In accordance with techniques herein, analysis of performance data for data portions of thin devices may be performed in order to determine whether particular data portions should have their data contents stored on PSDs located in a particular storage tier. The techniques herein may take into account how "busy" the data portions are in combination with defined capacity limits and defined performance limits (e.g., such as I/O throughput or I/Os per unit of time, response time, utilization, and the like) associated with a storage tier in order to evaluate which data to store on PSDs of the storage tier. The foregoing defined capacity limits and performance limits may be used as criteria to determine promotion and demotion thresholds based on projected or modeled I/O workload of a storage tier. Different sets of performance limits, also referred to as comfort performance zones or performance zones, may be evaluated in combination with capacity limits based on one or more overall performance metrics (e.g., average response time across all storage tiers for one or more storage groups) in order to select the promotion and demotion thresholds for the storage tiers.

Promotion may refer to movement of data from a first storage tier to a second storage tier where the second storage tier is characterized as having PSDs of higher performance than PSDs of the first storage tier. Demotion may refer generally to movement of data from a first storage tier to a second storage tier where the first storage tier is characterized as having PSDs of higher performance than PSDs of the second storage tier. As such, movement of data from a first tier of flash devices to a second tier of high-speed disk devices and/or low-speed disk devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy and other criteria. In accordance with techniques herein, an embodiment may determine amounts of the different storage tiers used to store an application's data, and thus the application's storage group, subject to the allocation policy and other criteria. Such criteria also may include one or more performance metrics indicating a workload of the application. For example, an embodiment may determine one or more performance metrics using collected or observed performance data for a plurality of different VSUs, and/or portions thereof, used by the application. Thus, the partitioning of the different storage tiers among multiple applications also may take into account the workload or how "busy" an application is. Such criteria also may include capacity limits specifying how much of each particular storage tier may be used to store data for the application's VSUs. As described in various embodiments herein, the criteria may include one or more performance metrics in combination with capacity limits, performance metrics alone without capacity limits, or capacity limits alone without performance metrics. Of course, as will be appreciated by those of ordinary skill in the art, such criteria may include any of the foregoing in combination with other suitable criteria.

As an example, the techniques herein may be described with reference to a storage environment having three storage tiers—a first tier of only SSDs in the data storage system, a second tier of only high-speed disk drives, and a third tier of only low-speed disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of PSDs have different types of characteristics. There are different reasons why one may want to use one storage tier and type of PSD over another depending on criteria, goals and the current performance characteristics exhibited in connection with performing I/O operations. For example, flash drives of the first tier may be a best choice or candidate for storing data which may be characterized as I/O intensive, "hot" or "busy" thereby experiencing a high rate of I/Os to frequently access the PSD containing the LV's data. However, flash drives tend to be expensive in terms of storage capacity. Low-speed disk drives may be a best choice or candidate for storing data of applications requiring a large storage capacity and which are not I/O intensive with respect to access and retrieval from the PSD (i.e., are "cold"). The second tier of high-speed disk drives may be characterized as "in between" flash drives and low-speed disk drives in terms of cost/GB and I/O performance. Thus, in terms of relative performance characteristics, flash drives may be characterized as having higher performance than both high-speed and low-speed disks, and high-speed disks may be characterized as having a higher performance than low-speed disks.

Since flash drives of the first tier are the best suited for high throughput/sec/GB, processing may be performed to determine which of the applications, and portions thereof, are characterized as most I/O intensive and therefore may be good candidates to have their data stored on flash drives. Similarly, the second most I/O intensive applications, and portions thereof, may be good candidates to store on high-speed disk drives of the second tier and the least I/O intensive applications may be good candidates to store on low-speed disk drives of the third tier. As such, workload for an application may be determined using some measure of I/O intensity, performance or activity (e.g., I/O throughput/second, percentage of read operation, percentage of write operations, response time, etc.) of each VSU or PSD used for the application's data. Some measure of workload may be used as a factor or criterion in combination with others described herein for determining what data portions are located on the PSDs of each of the different storage tiers.

As noted above, one or more RAs 40 may be configured to facilitate communications between data storage system 12 and other data storage systems, including without limitation any of a variety of data storage system available from EMC, such as, for example, storage systems from the VMAX, VMAX, VNX®, VNXe®, XtremIO™ and Isilon® product families, and data storage systems made available from other vendors such as, for example, IBM, HP, Hitachi Data Systems (HDS) and NetApp. In some embodiments, data storage system 12, including one or more RAs 40, may be configured to incorporate one or more of such other data storage systems into a tiered storage strategy (e.g., FAST), for example, using Federated Storage Tiering (FTS) technology made available by EMC, e.g., as described on the date of filing at http://www.emc.com/collateral/hardware/white-papers/h10698-federated-tiered-storage-wp.pdf, the contents of which are hereby incorporated by reference in their entirety.

Data storage system 12 may be part of a proprietary computer network 62, in which access to the network resources are under the purview or control of a single entity (via ownership or a contractual relationship—e.g., a lease), including without limitation a person or organization, for example, a business entity, government agency, education institution, other type of organization or any suitable combination of the foregoing. Network 62 may include any of hosts 14a, 14b, 14n, service processor 22, data storage system 12, cloud gateway 64, elements of network 18 described herein and other resources. Network 18 may include one or more network elements that define a firewall 63 for network 62, which restricts access to resources of network 62. Firewall 63 may be considered to define a virtual boundary between proprietary computer network 62, and resources that are external to network 62, for example, cloud-based storage systems 70a-n.

System 10 may include multiple cloud-based storage systems 70a-n that each provide cloud-based storage 72a-n, respectively, and are not part of proprietary computer network 62, but rather are under the purview of a different entity than the entity that controls network 62. Such systems 70a-n may include multiple data centers, and may be geographically diverse. For example, one or more of system 70-c may be provided by cloud storage providers, for example, Amazon Web Services, Inc. (AWS), Google and Apple, Inc. to name a few. Cloud storage providers typically store data according to object-based storage protocols. While storage resources within network 62 may exchange I/O communications with each other using standardized data storage protocols and interfaces (e.g., APIs), including without limitation SAN- and NAS-based protocols such as SCSI, iSCSI, Fibre Channel, Fibre Channel-over-Ethernet, NFS (Network File System), SMB (Server Message Block), CIFS (Common Internet File System) and AFP (Apple Filing Protocol), cloud storage providers typically are configured to utilize different, often non-standardized, provider-specific, cloud-based storage protocols and interfaces (e.g., APIs) for I/O communications. Such cloud storage protocols and interfaces include without limitation those of AWS, Dropbox, OpenStack, Google and Apple, and are often based on, or utilize, underlying object-based and/or Internet-based storage protocols and interfaces, such as, for example, HTTP (hyper-text transport protocol), JSON (JavaScript Object Notation) and SOAP (Simple Object Access Protocol), among others. It should be appreciated that network 62 also may include cloud-based storage systems (not shown) that are under the purview or control of the same entity that controls network 62.

In some embodiments (e.g., when implementing FTS), one or more of the other storage arrays with which an RA 40 facilitates I/O communications may be a storage system located outside of (i.e., "external" to) network 62, and which may be a cloud-based storage system, for example, any of systems 70a-n. As used herein, an "external storage system" is a storage system located outside of a proprietary network. In some such embodiments, FAST.X™ technology available from EMC may be employed, and in aspects of this embodiment, a tiered storage strategy (e.g., FAST) may be employed. The response times for I/O requests from hosts 14a-n to data stored within data storage system 12 (e.g., on one of PSDs 16*a-c*) may be faster than those for data accessed from other data storage systems remotely connected to data storage system, especially if the other data systems is not the same type as data system 12 and/or employs different storage technology and/or if the other data storage system is external to the proprietary network 62. However, it may be cheaper to store data on such other data storage systems. For this reason, in a tiered storage scheme, the lower tiers (e.g. the lowest tier) in which less important and/or less frequently accessed data (e.g., archived data or backup data), i.e., "cold" data, is stored may be implemented using remote storage systems, including external and/or cloud-based storage systems (e.g., 70*a-n*). In such a tiered storage scheme, host systems may remain unaware of the precise locations and PSUs on which their data is stored, including that their data is stored externally and/or on a cloud-based storage system.

As noted above, I/O communications between network resources within network 62 may be in accordance with one or more standard SAN- or NAS-based storage protocols or interfaces, and I/O communications with cloud-based storage systems, whether internal or external (e.g., any of systems 70*a-n*) to network 62, may be in accordance with one or more cloud-based storage protocols or interfaces. To facilitate I/O communications between data storage system 12 and cloud-based storage systems, one or more RAs may be configured to translate between NAS- and SAN-based protocols and interfaces, on the one hand, and cloud-based storage protocols and interfaces on the other. For example, one or more RAs 40 may be configured with cloud storage gateway technology, for example, as described in U.S. patent application Ser. No. 14/619,627, titled "Cloud-to-Cloud Data Migration Via Cache," by Anthony et al. filed on Feb. 11, 2015, and/or cloud gateway technology found within an EMC CloudArray® system. For example, RA 40 may implement a virtual version of EMC CloudArray. Other cloud storage gateway technologies may be employed.

For example, an I/O read request or write request may be issued from one of hosts 14*a-n* using a SAN- or NAS-based protocol that employs SCSI commands (i.e., a SCSI-based protocol) and received on communication path 51 by an HA 21. Such communication may be processed using one or more components of data storage system 12, including without limitation memory 26, storage management component 28, data services component 24, and RA 40. One of these components may determine that the I/O request corresponds to data stored on a cloud-based storage system (e.g., one of systems 70*a-n*), and RA 40 may translate the I/O request into an I/O request conforming to one or more cloud-based storage protocols associated with the destination cloud-based storage system, and transmit such cloud-based I/O request via communication path 61 and network 18 to the destination cloud-based storage system. The cloud-based storage system may respond to the cloud-based I/O request with a cloud-based I/O response in accordance with one or more cloud-based storage protocols. RA 40 may receive the cloud-based I/O response, translate it into a SAN- or NAS-based I/O response, and initiate transmission of the SAN- or NAS-based I/O response through data storage system 12, via HA 21 to the requesting host 14.

In some embodiments of the invention, a cloud storage gateway 64 may be provided, which is a separate component from data storage system 12, and which includes some or all of the translation functionality described above in relation to RA 40. Gateway 64 may be an EMC CloudArray appliance, and may include a cache 65. The data of an I/O write request bound for a cloud-based storage system initially may be stored in cache 65, before being de-staged to the cloud-based storage system. In embodiments of the invention in which cloud storage gateway technology is embodied in RA 40, data storage system 12 or RA 40 itself may have a cache dedicated to cloud-base storage systems, and/or use one or more portions of memory 26. One or more RAs 40 and a cloud storage gateway 64 may be configured to collectively perform any of the cloud gateway techniques described herein, e.g., translation between SAN- and NAS-based interfaces and protocols and cloud storage-based protocols.

In some embodiments in which an I/O operation is performed remotely (i.e., the I/O operation of an I/O request received at storage system 12 is performed on another storage system—i.e., the remote storage system), synchronous storage techniques may be employed, in which a response indicative of completion, failure or otherwise of the I/O request is sent to the host only after an indication of completion, failure or otherwise is received from the remote storage system. In some embodiments in which an I/O operation is performed remotely, asynchronous storage techniques may be employed, in which a response indicative of completion or failure of the I/O request may be sent to the host before an indication of completion or failure is received from the remote storage system. In such embodiments, one or more RAs may be configured to implement such asynchronous storage techniques. Such techniques may include, in the case of a write operation to a cloud-based storage system and/or a storage system external to the proprietary network of the host, sending an indication of completion or failure to the host in response to the write operation being cached in a local cache (e.g., 65 or 25*b*) before being de-staged to the cloud-based and/or external storage system. One or more RAs 40 and/or cloud storage gateway 64 may be configured to implement the synchronous and asynchronous techniques described herein.

Illustrative embodiments of the invention, which may be implemented using any suitable system or component thereof of the systems described in relation to FIGS. 1-3, will now be described.

Figure 4:
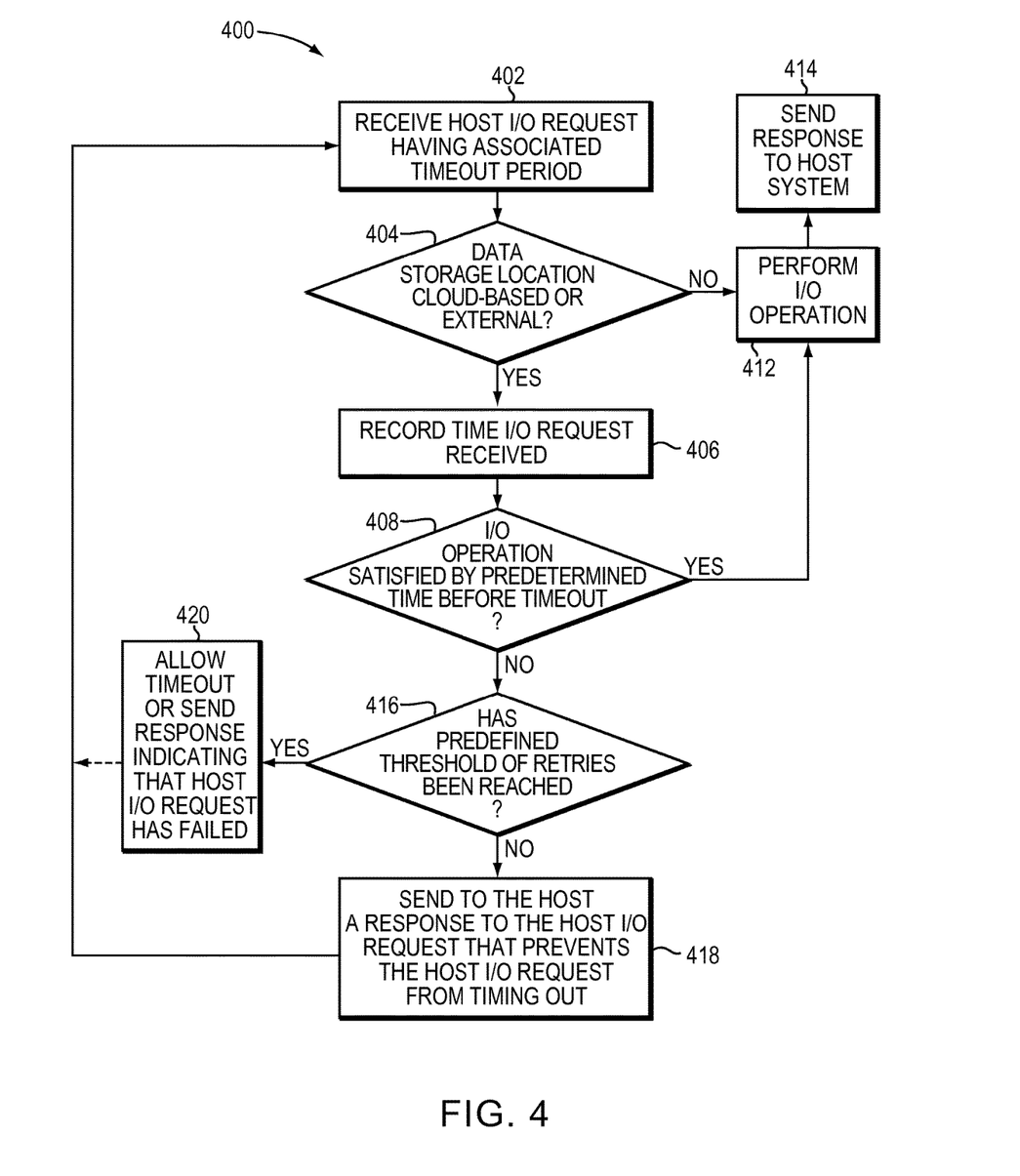
FIG. 4 is a flowchart illustrating an example of a method of preventing timeout for an I/O request associated with a cloud-based storage system, in accordance with some embodiments of the invention.

FIG. 4 is a flowchart illustrating an example of a method 400 of preventing timeout for an I/O request associated with a cloud-based storage system, in accordance with some embodiments of the invention. Method 400 is merely an illustrative embodiment of a method of preventing timeout for an I/O request, and is not intended to limit the scope of the invention. Any of numerous other implementations of such a method, for example, variations of method 400, are possible and are intended to fall within the scope of the invention.

In act 402, an I/O request from a host system ("host I/O request") may be received, for example, by a component (e.g., HA 21) of a storage system (e.g., 12) from a host (e.g., 14*a*). The storage system may be part of a proprietary (e.g., enterprise) computer network (e.g., 62). The I/O request may specify an I/O operation (e.g., read or write) to perform on certain data, and may have a timeout period associated therewith. The timeout period may be a default value, for example, pre-established between the data storage system and the requesting host (e.g., thirty seconds), e.g., according to a data storage protocol (e.g., SCSI); or the timeout period may be specified in the I/O request itself, and may be different than the default value.

In act 404, it may be determined that the data specified in the request corresponds to a cloud-based or external storage location. If the storage location is not external or cloud-based, then in act 412 the I/O operation may be performed (or attempted and failed), and in act 414 a response to the I/O may be sent to the host.

If the storage location is external or cloud-based, the time at which the host issued the I/O request may be recorded in act 406. In some embodiments of the invention, given the relative temporal proximity between the time at which the host I/O request is received by the storage system and the time at which the host I/O request was issued, these values may be considered the same.

In act 408, it may be determined whether the I/O operation is satisfied by a predetermined time prior to termination of timeout period (i.e., before "timeout"). For example, if the timeout period is thirty seconds, the predetermined time may be twenty-five seconds from issuance of the timeout request (i.e., five seconds before timeout). If a synchronous storage technique is employed (e.g., as described above in relation to FIG. 1), act 408 may include sending a translated I/O request to the external or cloud-based storage specifying the same I/O operation, which may involve translating (e.g., by a cloud storage gateway component) one or more protocols or interfaces of the host I/O request (e.g., SAN- or NAS-based) into one or more protocols or interfaces of the external or cloud-based storage system (e.g., cloud-based and/or Internet-based protocols). In such a synchronous embodiment, act 408 may include determining whether a response to the translated I/O request has been received from the external and/or cloud-based storage system by the predetermined time, and the I/O operation may be deemed to be satisfied when such response is received.

In embodiments in which an asynchronous storage technique is employed (e.g., as described above in relation to FIG. 1), and the I/O operation is a write operation, act 408 may include determining (e.g., by a cloud storage gateway component) whether the specified I/O operation is cached (before sending a translated I/O request to the external and/or cloud-based storage system) by the predetermined time before the timeout period expires. It may not be possible to cache the translated I/O operation prior to the predetermined time because the cache may be full, e.g., because of a high amount of I/O traffic or a network failure, among other reasons. In such an asynchronous embodiment, the I/O operation may be deemed to be satisfied when the I/O operation is cached.

If it is determined that the I/O operation has been satisfied prior to the timeout period, method 400 may proceed to act 412, described above; otherwise, method 400 may proceed to act 416. In act 416, it may be determined whether a predefined threshold of retries has been reached. The predefined threshold may be set to any value (e.g., 1, 5, 10, 100, 1000, or even more), depending on any of a variety of factors, including the number of time-outs permitted by the host, and the behavior desired by a system administrator and/or the owner (e.g., customer) of the data subject to the I/O request. For example, a storage system administrator may not want to tie up system resources by repeatedly causing retries, or may believe that the amount of time corresponding to a certain number of retry cycles is long enough or may indeed be the result of a real problem (e.g., external network issues) for which reporting a timeout to the host is desirable. It should be appreciated that, in some embodiments, there may be no threshold; i.e., the number of retries may be infinite. Such an embodiment may be desirable if one wants to rely on the host or the user of host application to determine when to stop trying.

If the threshold number of retries has not been reached, then, in act 418, a response to the host I/O request may be sent to the host that prevents the host I/O request from timing out. In some embodiments, such response may be configured to cause the host to "retry," i.e., send another I/O request specifying the same I/O operation. For example, as described above, if the storage protocol employs SCSI commands, the response may include SCSI sense data including the check condition key and other fields indicating to retry, e.g., "02/0B/44." Other SCSI codes may be used, as well as other codes according to whatever storage protocol is used.

In response to receiving the response described in act 418, the host system may retry by sending another I/O request specifying the same I/O operation in act 402, in which case method 400 may be repeated. Alternatively, the host may be configured to not resend a request, but rather terminate the subject application, for example, after a certain number of check conditions (even as few as one) has been received.

If it determined in act 416 that the predetermined number of thresholds has been reached, then in act 420 a response to the host I/O request may be sent indicating that the host I/O request has failed (or the like). Alternatively, no response may be sent to the host, thereby allowing the timeout to occur. The latter approach may be preferred to allow the host, application or application user to decide how it wants to handle long response delays. As described above, some hosts allow an unlimited number of timeouts to occur, so it may not be desirable indicate a failure. The former approach may be desirable for similar reasons described above in relation to setting a threshold value in relation to act 416. In either scenario, depending on the configuration of the host and/or application, method 400 may be repeated.

Method 400 may be repeated any number of times that the host or data system (e.g., according to the predefined threshold of retries) allows. Further, it should be appreciated that a command may be issued by an application user of storage system administrator that halts performance of method 400 for any one or more I/O operations, or the system may fail for other reasons.

Figure 5:
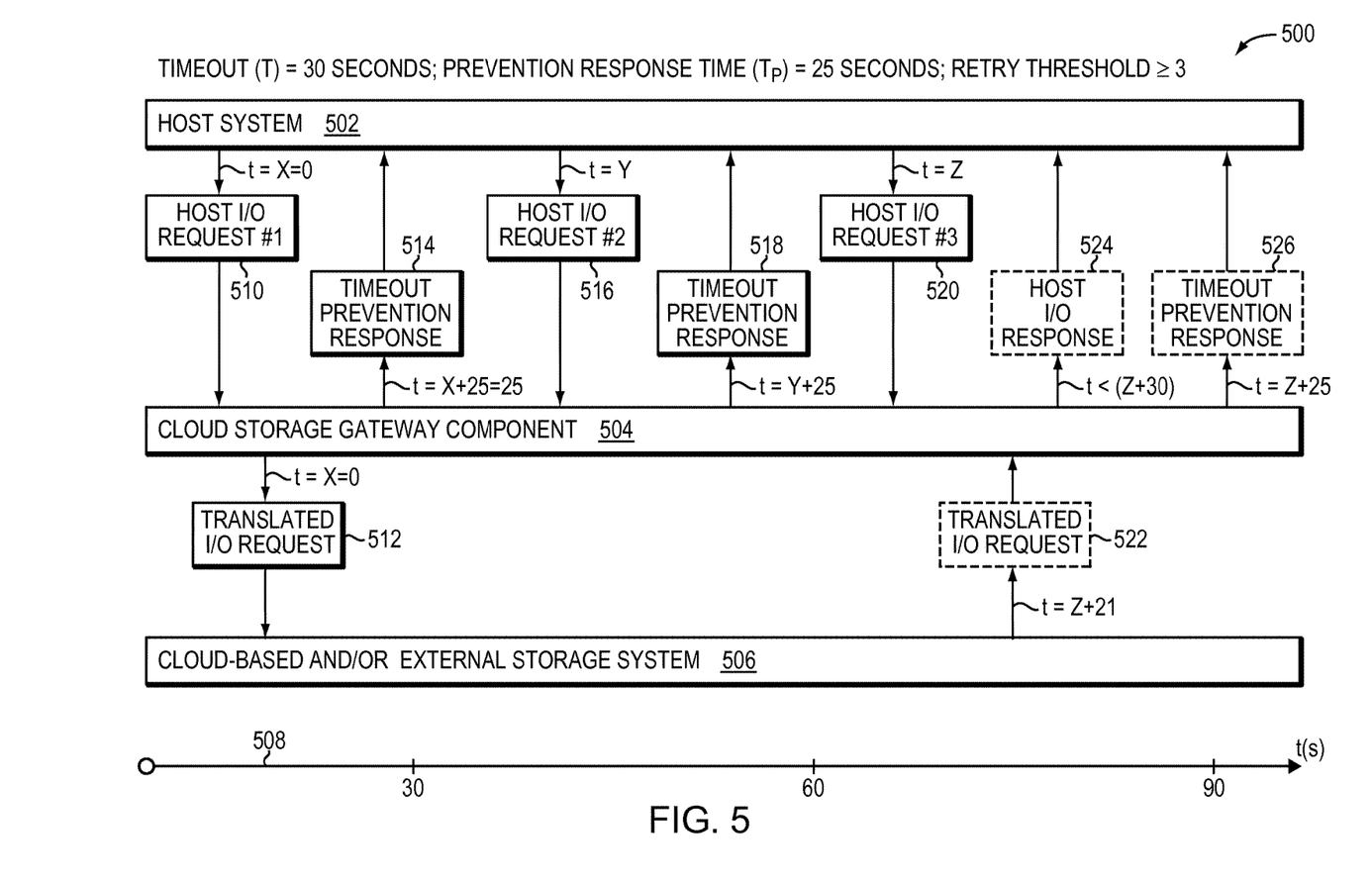
FIG. 5 is a timing diagram illustrating the timing relationships between I/O requests and responses in accordance with some embodiment of the invention.

FIG. 5 is a timing diagram 500 illustrating the timing relationships between I/O requests and responses in accordance with some embodiments of the invention. The timing relationships shown are merely illustrative embodiments, and are not intended to limit the scope of the invention. Any of numerous other implementations of such timing relationships, for example, variations of those illustrated in timing diagram 500, are possible and are intended to fall within the scope of the invention.

As illustrated in FIG. 5, in timing diagram 500, the timeout period (T) is thirty (30) seconds, the predetermined time prior to timeout at which a response will be sent to the host to prevent timeout ("the prevention response time;" $T_p$)=twenty-five (25) seconds, and the predefined threshold of retries ("retry threshold")>=three (3).

Host system 502 (e.g., any of 14a-n) sends host I/O request #1 510 (specifying an I/O operation to be performed) to cloud storage gateway component 504 (e.g., RA 40 or cloud storage gateway 65) at time X=0, and it may be determined by component 504 that the I/O request corresponds to an external and/or cloud-based storage system 506. In a synchronous storage embodiment, component 504 may send a translated I/O request 512 to cloud-based and/or external storage system 506 (e.g., any of 70a-n). In an asynchronous embodiment in which the I/O operation is a write operation, component 504 may attempt to cache the I/O operation (not shown), for example, as described above. If it is determined at time T+25 that the I/O operation has not been satisfied, then timeout prevention response 514 is sent from component 504 to the host system 502.

In response to receiving response 514, host system 502 may (unless configured otherwise) and, at time Y, send host I/O request #2 516, specifying the same I/O operation, to component 504. If by time Y+25 a response to request 512 has not been received from system 506 (in a synchronous embodiment) or component 504 has been unable to cache the I/O operation (in an asynchronous embodiment), then component 504 may send timeout prevention response 518 to host system 502.

In response to receiving response 518, host system 502 may (unless configured otherwise) and, at time Z, send host I/O request #3 520, specifying the same I/O operation, to component 504. If by time Z+25 a response to request 512 has not been received from system 506 (in a synchronous embodiment) or component 504 has been unable to cache the I/O operation (in an asynchronous embodiment), then component 504 may send timeout prevention response 526 to host system 502. Alternatively, if by time Z+25, a response to request 512 has been received from system 506 (e.g., translated I/O response 522 at Z+21) (in a synchronous embodiment) or component 504 has been able to cache the translated I/O operation (in an asynchronous embodiment), then host I/O response 524 may be transmitted to host 502 prior to the timeout for request 520 (i.e., at t<(Z+30)).

The methods described herein (e.g., method 400) may be implemented using any of the systems described above in relation to FIGS. 1-3. For example, one or more components of any of the systems described in relation to FIGS. 1-3 may be configured with logic to perform one or more of the acts described herein, for example, in relation to method 400. Such logic may be embodied in one or more discrete modules of the system. Further, in some embodiments of the invention, a computer-readable storage medium is provided, encoded with computer-executable instructions that, as a result of being executed by a computer, control the computer to perform one or more of the foregoing acts.

Methods (e.g., method 400), and acts thereof, described herein, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs that, as a result of being executed by a computer, instruct the computer to perform one or more of the functions described herein, and/or various embodiments, variations and combinations thereof. Such instructions may be written in any of a plurality of programming languages or scripts, for example, Java, J#, Visual Basic, C, C#, or C++, Perl, Fortran, Pascal, Eiffel, Basic, COBOL, etc., or any of a variety of combinations thereof. The computer-readable media on which such instructions are embodied may reside on one or more of the components of any systems described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a system, for example, any of the systems described herein, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of an ordinal term such as "first", "second", "third", etc., in the claims to qualify a claim element does not by itself connote any priority, precedence, or order of one claim element over another or the temporal order in which acts of a method are performed, but are used merely as reference labels to distinguish one claim element (in a same or different claims) having a certain name from another element having a same name (but for use of the ordinal term). Use of an ordinal label other than "first" before a claim element does not mean that the invention recited in the claim necessarily includes at least one other element of the same name. For example, recitation of a "second" "item" in a claim does not mean that the invention recited in the claim necessarily includes a first "item." Only recitation of a "first" "item" in the same claim or a claim from which the claim depends would necessarily make such element a part of the recited invention.

What is claimed is:

1. A method comprising:
receiving, at a first data storage system, a first I/O request, the first I/O request originating from a host system and specifying an I/O operation to perform on first data, and having an associated first timeout period, the first I/O request avoiding a requirement for performance in a strict queuing order;
determining that the I/O operation is for a second data storage system that is a cloud-based or external storage system;
determining whether the I/O operation has been satisfied within a first predetermined amount of time, wherein the first predetermined amount of time is less than the first timeout period, prior to the expiration of the first timeout period;
if it is determined that the I/O operation has not been satisfied within the first predetermined amount of time prior to the expiration of the first timeout period, sending to the host system a first response to the first I/O request that will prevent the first I/O request from timing out.

2. The method of claim 1, further comprising:
in response to determining that the I/O operation is for a second storage location, sending a second I/O request to the second data storage system, the second I/O request specifying the I/O operation to perform on the first data,
wherein the act of determining whether the I/O operation has been satisfied comprises, determining whether the second I/O request has been satisfied by the first predetermined amount of time prior to the expiration of the first timeout period.

3. The method of claim 2, wherein the second data storage system is a cloud-based storage system, and
wherein the first I/O request and first response are transmitted in accordance with a SAN-based or NAS-based storage protocol, and the second I/O request is transmitted in accordance with a cloud-based storage protocol.

4. The method of claim 2, further comprising:
receiving the second I/O request at the first data storage system, the second I/O request having an associated second timeout period;
determining whether the I/O operation has been satisfied by a second predetermined amount of time, wherein the second predetermined amount of time is less than the second timeout period, prior to the expiration of the second timeout period;
if it is determined that the I/O operation has not been satisfied by a predetermined amount of time prior to the expiration of the timeout period, sending to the host system a second response to the second I/O request that will prevent the second I/O request from timing out.

5. The method of claim 1, wherein the first data storage system includes a cache for external and/or cloud-based storage systems, wherein the method further comprises an act of, in response to determining that the storage location is within a second data storage system, determining whether a second I/O request to the second data storage system can be cached in the cache, the second I/O request specifying the I/O operation to perform on the first data, and
wherein the act of determining whether the I/O operation has been satisfied comprises determining whether the second I/O request has been added to the cache by the first predetermined amount of time prior to the expiration of the first timeout period.

6. The method of claim 1, wherein the first response is configured to send a second I/O request to the first storage system specifying the I/O operation to perform on the first data.

7. The method of claim 1, further comprising:
determining that the I/O operation has been satisfied by the first predetermined amount of time prior to the expiration of the first timeout period; and
in response to determining that the I/O operation has been satisfied, sending a second response to the host, system in satisfaction of the first I/O request.

8. The method of claim 1, wherein the I/O operation is a read operation.

9. A non-transitory computer-readable storage medium having computer-executable instructions stored thereon that, as a result of being executed by a computer, control the computer to perform, for a system comprising a plurality of physical storage devices, a method comprising acts of:
receiving, at a first data storage system, a first I/O request originating from a host system and specifying an I/O operation to perform on first data, and having an associated first timeout period, the first I/O request avoiding a requirement for performance in a strict queuing order;
determining that the I/O operation is for a second data storage system that is a cloud-based or external storage system;
determining whether the I/O operation has been satisfied within a first predetermined amount of time, wherein the first predetermined amount of time is less than the first timeout period, prior to the expiration of the first timeout period;
if it is determined that the I/O operation has not been satisfied within the first predetermined amount of time prior to the expiration of the first timeout period, sending to the host system a first response to the first I/O request that will prevent the first I/O request from timing out.

10. The computer-readable storage medium of claim 9, the method further comprising:
in response to determining that the I/O operation is for a second storage location, sending a second I/O request to the second data storage system, sending a second I/O request to the second data storage system, the second I/O, request specifying the I/O operation to perform on the first data,
wherein the act of determining whether the I/O operation has been satisfied comprises determining whether the second I/O request has been satisfied by the first predetermined amount of time prior to the expiration of the first timeout period.

11. The computer-readable storage medium of claim 10, wherein the second data storage system is a cloud-based storage system, and
wherein the first I/O request and first response are transmitted in accordance with a SAN-based or NAS-based storage protocol, and the second I/O request is transmitted in accordance with a cloud-based storage protocol.

12. The computer-readable storage medium of claim 10, further comprising: receiving the second I/O request at the first data storage system, the second I/O request having an associated second timeout period:
determining whether the I/O operation has been satisfied by a second predetermined amount of time, wherein the second predetermined amount of time is less than the second timeout period, prior to the expiration of the second timeout period;
if it is determined that the I/O operation has not been satisfied by the second predetermined amount of time prior to the expiration of the timeout period, sending to the host system a second response to the second I/O request that will prevent the second I/O request from timing out.

13. The computer-readable storage medium of claim 9, wherein the first data storage system includes a cache for external and/or cloud-based storage systems, wherein the method further comprises an act of, in response to determining that the storage location is within a second data storage system, determining whether a second I/O request to the second data storage system can be cached in the cache, the second I/O request specifying the I/O operation to perform on the first data, and
wherein the act of determining whether the I/O operation has been satisfied comprises determining whether the second I/O request has been added to the cache by the first predetermined amount of time prior to the expiration of the first timeout period.

14. The computer-readable storage medium of claim 9, wherein the first response is configured to cause the host system to send a second I/O request to the first storage system specifying the I/O operation to perform on the first data.

15. The computer-readable storage medium of claim 9, wherein the method further comprises: determining that the I/O operation has been satisfied by the first predetermined amount of time prior to the expiration of the first timeout period; and
in response to determining that the I/O operation has been satisfied, sending a second response to the host system in satisfaction of the first I/O request.

16. The computer-readable storage medium of claim 9, wherein the I/O operation is a read operation.

17. A first data storage system comprising:
a host adapter to receive a first I/O request originating from a host system and specifying an I/O operation to perform on first data, and having an associated first timeout period, the first I/O request avoiding a requirement for performance in a strict queuing order;
first logic to determine determining that the I/O operation is for a second data storage system that is a cloud-based or external storage system;
second logic to determine determining whether the I/O operation has been satisfied within a first predetermined amount of time, wherein the first predetermined amount of time is less than the first timeout period, prior to the expiration of the first timeout period;
third logic to send to the host system, if it is determined that the I/O operation has not been satisfied within the first predetermined amount of time prior to the expiration of the first timeout period, sending to the host system a first response to the first I/O request that will prevent the first I/O request from timing out.

18. The system of claim 17, further comprising:
fourth logic to send a second I/O request to the second data storage system in response to determining that the I/O operation is for a second storage location, sending a second I/O request to the second data storage system, the second I/O request specifying the I/O operation to perform on the first data,
wherein the second logic act of determining whether the I/O operation has been satisfied comprises logic to determine determining whether the second I/O request has been satisfied by the first predetermined amount of time prior to the expiration of the first timeout period.

19. The system of claim 18, wherein the second data storage system is a cloud-based storage system, and
wherein the first I/O request and first response are transmitted in accordance with a SAN-based or NAS-based storage protocol, and the second I/O request is transmitted in accordance with a cloud-based storage protocol.

20. The system of claim 18, further comprising:
fourth logic to receive receiving the second I/O request at the first data storage system, the second I/O request having an associated second timeout period;
fifth logic to determine determining whether the I/O operation has been satisfied by a second predetermined amount of time, wherein the second predetermined amount of time is less than the second timeout period, prior to the expiration of the second timeout period; and
sixth logic to send to the host system, if it is determined that the I/O operation has not been satisfied by the second predetermined amount of time prior to the expiration of the timeout period, sending to the host system a second response to the second I/O request that will prevent the second I/O request from timing out.

* * * * *